United States Patent
Popovic

(10) Patent No.: US 9,407,401 B2
(45) Date of Patent: Aug. 2, 2016

(54) METHOD FOR GENERATING A SUPERSET OF QUASI-ORTHOGONAL SETS OF SEQUENCES

(71) Applicant: HUAWEI TECHNOLOGIES CO., LTD., Shenzhen (CN)

(72) Inventor: Branislav Popovic, Kista (SE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 242 days.

(21) Appl. No.: 14/064,523

(22) Filed: Oct. 28, 2013

(65) Prior Publication Data
US 2014/0050076 A1  Feb. 20, 2014

Related U.S. Application Data

(63) Continuation of application No. PCT/CN2011/073477, filed on Apr. 28, 2011.

(51) Int. Cl.

| | |
|---|---|
| *H04J 11/00* | (2006.01) |
| *H04L 5/00* | (2006.01) |
| *H04J 13/00* | (2011.01) |
| *H04J 13/14* | (2011.01) |
| *H04W 74/08* | (2009.01) |
| *H04J 13/10* | (2011.01) |

(52) U.S. Cl.
CPC ............ *H04L 5/0007* (2013.01); *H04J 13/0062* (2013.01); *H04J 13/102* (2013.01); *H04J 13/14* (2013.01); *H04W 74/0833* (2013.01)

(58) Field of Classification Search
USPC .................................................. 370/208, 255
See application file for complete search history.

(56) References Cited

U.S. PATENT DOCUMENTS

| 7,580,814 B1 | 8/2009 | Seroussi |
| 2003/0076872 A1 | 4/2003 | Jalloul et al. |

(Continued)

FOREIGN PATENT DOCUMENTS

| CN | 1337105 | 2/2002 |
| CN | 101574010 | 11/2009 |

(Continued)

OTHER PUBLICATIONS

PCT International Search Report and Written Opinion of the International Searching Authority mailed Jan. 19, 2012 in corresponding International Application No. PCT/CN2011/073477.

(Continued)

*Primary Examiner* — Yemane Mesfin
*Assistant Examiner* — Mon Cheri Davenport
(74) *Attorney, Agent, or Firm* — Staas & Halsey LLP

(57) ABSTRACT

Generate a first set S comprising a plurality of quasi-orthogonal sets of sequences; generate L number of second sets of quasi-orthogonal sets of sequences $T_h$ by symbol-by-symbol multiplication of each sequence in the first set S with signature sequences $\{w_h(k)\}$, wherein $h=0,\ldots,L-1$, L is a positive integer larger than or equal to one, and each second set $T_h$ has the same number of quasi-orthogonal sets of sequences and the same length of sequences as the first set S; and generate a superset Z of quasi-orthogonal sets of sequences as the union of the first set S and the L number of second sets $T_h$.

20 Claims, 1 Drawing Sheet

(56) References Cited

U.S. PATENT DOCUMENTS

| | | | |
|---|---|---|---|
| 2007/0177631 A1 | 8/2007 | Popovic et al. | |
| 2008/0165903 A1* | 7/2008 | Hooli et al. | 375/343 |
| 2009/0303961 A1 | 12/2009 | Popovic et al. | |
| 2011/0116436 A1* | 5/2011 | Bachu et al. | 370/312 |

FOREIGN PATENT DOCUMENTS

| | | |
|---|---|---|
| CN | 101617477 | 12/2009 |
| CN | 101917356 A | 12/2010 |
| EP | 1143651 | 10/2001 |
| EP | 2317670 | 5/2011 |
| WO | 01/56218 | 8/2001 |
| WO | 03/030425 | 4/2003 |
| WO | 2010/020100 | 2/2010 |
| WO | 2011/022885 A1 | 3/2011 |

OTHER PUBLICATIONS

Gregory E. Bottomley, "Signature Sequence Selection in a CDMA System with Orthogonal Coding", IEEE Transactions on Vehicular Technology, vol. 42, No. 1, Feb. 1993, pp. 62-68.

Kyeongcheol Yang et al., "Quasi-Orthogonal Sequences for Code-Division Multiple-Access Systems", IEEE Transactions on Information Theory, vol. 46, No. 3, May 2000, pp. 982-993.

Abhijit G. Shanbhag et al., "Optimal QPSK Modulated Quasi-Orthogonal Functions for IS-2000", IEEE $6^{th}$ Int. Symp. on Spread Spectrum Tech & Appli., NJIT, New Jersey, USA, Sep. 6-8, 2000 pp. 756-760.

Thomas Strohmer et al., "Grassmannian Frames with Applications to Coding and Communication", pp. 1-28.

Robert W. Heath, Jr. et al., "On Quasi-Orthogonal Signatures for CDMA Systems", IEEE Transactions on Information Theory, vol. 52, No. 3, Mar. 2006, pp. 1217-1226.

Ian F. Blake et al., "A Note on Complex Sequences with Low Correlations", IEEE Transactions on Information Theory, vol. IT-28, No. 5, Sep. 1982, pp. 814-816.

Leopold Bömer et al., "Binary and Biphase Sequences and Arrays with Low Periodic Autocorrelation Sidelobes", IEEE Explore, vol. 3, Apr. 3-6, 1990, pp. 1663-1666.

Leopold Bömer et al., "Perfect Three-Level and Three-Phase Sequences and Arrays", IEEE Transactions on Communications, vol. 42, No. 2/3/4, Feb./Mar./Apr. 1994, pp. 767-772.

R. A. Scholtz et al., "GMW Sequences", IEEE Transactions on Information Theory, vol. IT-30, May 1984, pp. 548-553.

Branislav M. Popović, "Fourier Duals of Björck Sequences", Sequences and Their Applications—SETA 2010, pp. 253-258.

Chinese Office Action dated Apr. 3, 2014 in corresponding Chinese Patent Application No. 201180001374.X.

Chinese Office Action dated Aug. 5, 2014 in corresponding Chinese Patent Application No. 201180001374.X.

Extended European Search Report dated Aug. 8, 2014 in corresponding European Application No. 11864148.9.

International Search Report mailed Jan. 19, 2012 in corresponding International Application No. PCT/CN2011/073477.

\* cited by examiner

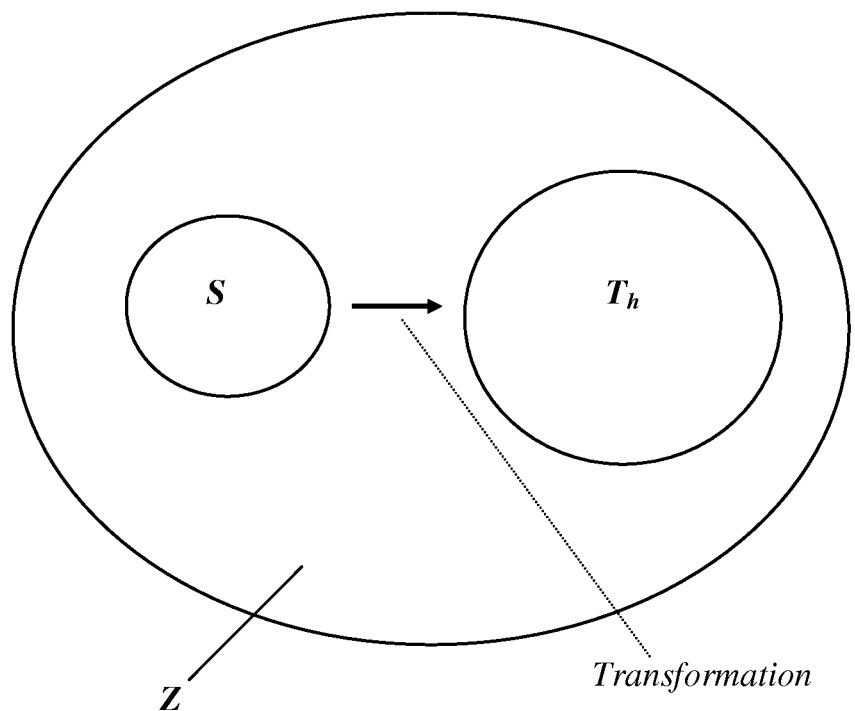

METHOD FOR GENERATING A SUPERSET OF QUASI-ORTHOGONAL SETS OF SEQUENCES

CROSS-REFERENCE TO RELATED APPLICATIONS

This application is a continuation of International Application No. PCT/CN2011/073477, filed on Apr. 28, 2011, of which is hereby incorporated by reference in its entirety.

TECHNICAL FIELD

The present disclosure relates to a method for generating a superset Z of quasi-orthogonal sets of sequences. Furthermore, the disclosure also relates to use, a computer program, a computer program product, and a device thereof.

BACKGROUND

In an orthogonal set of sequences the inner product between any two sequences from the set is zero. A quasi-orthogonal (QO) set of sequences is a union of a number of different orthogonal sets of sequences, where all the sequences are of the same length and energy, such that the absolute value of the inner product of any two sequences belonging to the different orthogonal sets is much less than the energy of the sequences.

The interest in QO sets of polyphase sequences has been increased recently due to extensive use of Zadoff-Chu (ZC) sequences in various parts of LTE cellular standard. A ZC sequence of length N and of root index u is defined as:

$$z_u(k) = W_N^{uk(k+N \bmod 2 + 2q)/2}, k=0,1,\ldots,N-1, \quad (1)$$

where $W_N = e^{-j2\pi/N}$, $j = \sqrt{-1}$, while u, N are any positive integers such that u<N, (u,N)=1, while q is any integer.

In particular, LTE Random Access Channel (RACH) preambles, as well as uplink Sounding Reference Signals (SRS), are defined as cyclic versions of a prime length ZC sequence with cell-specific root indices. As a ZC sequence is a Constant Amplitude Zero (periodic) Autocorrelation (CAZAC) sequence, the set of all its cyclic versions form an orthogonal set of sequences. The union of N−1 cell-specific orthogonal sets of cyclic prime length ZC sequences, corresponding to all N−1 different root indices, forms a QO set of polyphase sequences $\{s_{m,l}(k)\}$, m=1, ..., N−1, l,k=0, 1, ..., N−1, N is a prime, which can be described mathematically as:

$$s_{m,l}(k) = z_m(k+l(\bmod N)), \quad (2)$$

m=1, ..., N−1, l,k=0, 1, ..., N−1.

The usual measure of interference between the synchronization sequences belonging to different orthogonal sets is the inner product of the sequences. The inner product of two sequences x={x(k)} and y={y(k)}, k=0, 1, ..., N−1, is defined as:

$$\langle x, y \rangle = \sum_{k=0}^{N-1} x^*(k) y(k),$$

a.

where "*" denotes complex conjugation.

The absolute value of the inner product of any two sequences (2) belonging to the different orthogonal sets is equal to $\sqrt{N}$. This property of the inner product follows directly from the cross-correlation properties of ZC sequences.

The construction of QO sets has been initially motivated by the need to create the user-specific sets of orthogonal spreading codes, used both for information error-control coding and spectrum spreading in synchronous code-division multiple-access (CDMA) systems, so that the interference in the system is minimized. Another motivation was the need to increase the number of users in a synchronous CDMA system using Walsh sequences, such as the downlink of IS-95 cellular system, without increasing the length of spreading sequences.

The QO sets are typically constructed by using specially designed cover sequences, also called "mask sequences" or "signature sequences", so that all the sequences within an orthogonal set are multiplied symbol-by-symbol with a common unique cover/signature sequence. Minimization of the maximum absolute inner product between any two sequences belonging to the different orthogonal sets is the primary criterion for the signature design, although some additional criteria have been considered as well.

As the design of QO sets has been always motivated by the applications in the real-life cellular systems, the resulting QO sequences were typically either binary or quadriphase, matched to the modulation formats used in real systems prior to LTE systems.

The QO sets of polyphase sequences have been introduced in LTE system, as mentioned before. An another construction of QO sets of polyphase sequences has been proposed based on a modification of prime-length Alltop's cubic phase sequences. The QO sets of cubic phase sequences of prime length N are defined as:

$$s_{m,l}(k) = e^{j2\pi(k-m)^3/N} e^{j2\pi lk/N}, m,l,k=0,1,\ldots,N-1, \quad (3)$$

The first exponential term, the m-th cyclically shifted version of the cubic phase sequence, is the mask sequence defining the m-th orthogonal set. Indeed, the construction of equation (3) produces N orthogonal subsets, each containing N sequences of length N, such that the absolute value of the inner product of any two sequences belonging to the different orthogonal sets is less than or equal to $\sqrt{N}$. Similar construction has also appeared as:

$$s_{m,l}(k) = \frac{1}{\sqrt{N}} e^{j2\pi(k^3-m)/N} e^{j2\pi lk/N}, m, l, k = 0, 1, \ldots, N-1,$$

where the sequence elements are normalized with $1/\sqrt{N}$ to have all sequences of unit energy. The above equation seems to be just a version of equation (3) with a typo, as it is trivial to show that it does not generate a QO set of sequences (the different orthogonal subsets are equivalent versions of each other, up to a complex constant).

Expected increase of the number of users in the future versions of wireless cellular communication systems, such as the LTE cellular system, will demand an increased number of RACH preambles and SRSs having minimal mutual multiple access interference at the common serving base station receiver. Thus it might be needed to have QO sets with more than N orthogonal subsets of sequences of length N, where the maximum absolute value of the inner product is kept much lower than the sequence energy.

Additionally, it might be desirable that some special additional conditions are satisfied, particularly to be possible to create QO sets that have minimum interference between a certain number of orthogonal sets.

SUMMARY

An object of the present invention is to provide a method which solves and/or mitigates the drawbacks of prior art.

More specifically, an object of the present invention is to provide a method for extending the number of quasi-orthogonal sequences based on existing sets of sequences.

Another object of the invention is to provide an extended number of sequences with good correlation properties.

Yet another object of the present invention is to provide an alternative method for generating quasi-orthogonal sets of sequences for wireless communication systems.

According to one aspect of the invention, the objects are achieved with a method for generating a superset Z of quasi-orthogonal sets of sequences, comprising the steps of:

generating a first set S comprising a plurality of quasi-orthogonal sets of sequences;

generating L number of second sets of quasi-orthogonal sets of sequences $T_h$ by symbol-by-symbol multiplication of each sequence in said first set S with signature sequences $\{w_h(k)\}$, wherein h=0, ..., L−1, L is a positive integer larger than or equal to one, and each second set $T_h$ has the same number of quasi-orthogonal sets of sequences and the same length of sequences as said first set S; and generating said superset Z as the union of said first set S and said L number of second sets $T_h$ so that:

$$Z = S \bigcup_{h=0}^{L-1} T_h.$$

Different embodiments of the method above are disclosed in the appended dependent claims.

According to another aspect of the invention, the objects are also achieved with a device for generating a superset Z of quasi-orthogonal sets of sequences, said device being adapted to:

generate a first set S comprising a plurality of quasi-orthogonal sets of sequences;

generate L number of second sets of quasi-orthogonal sets of sequences $T_h$ by symbol-by-symbol multiplication of each sequence in said first set S with signature sequences $\{w_h(k)\}$, wherein h=0, ..., L−1, L is a positive integer larger than or equal to one, and each second set $T_h$ has the same number of quasi-orthogonal sets of sequences and the same length of sequences as said first set S; and generate said superset Z as the union of said first set S and said L number of second sets $T_h$ so that:

a.
$$Z = S \bigcup_{h=0}^{L-1} T_h.$$

Furthermore, the invention also relates to use of such sequences, a computer program and a computer program product thereof.

The present invention provides an extended set of quasi-orthogonal sets of sequences from an existing set, thereby providing a solution which supports more users in wireless communication systems, such as LTE and LTE Advanced, than prior art solutions.

Further, as the superset Z according to the present invention is the union of an existing set of sequences and a transformation of the same, a backwards compatible solution is thereby provided which is clearly advantageous.

Moreover, quasi-orthogonal sequences generated according to the invention show good correlation properties which e.g. will keep interference low in communication systems using such sequences. Hence, the present invention provides good trade off between number of users possible and interference.

Other applications and advantages of the present invention will be apparent from the following detailed description.

BRIEF DESCRIPTION OF THE DRAWING

FIG. 1 graphically illustrates an embodiment of the present invention.

EMBODIMENTS

Let S be a first QO set, comprising of a number of orthogonal sets of synchronization sequences. For example, the set S can be the QO set consisting of N−1 orthogonal sets of cyclically shifted ZC sequences of prime length N, corresponding to all N−1 different root indices.

Let $T_n$ be a second QO set, having the same number of orthogonal sets of sequences of the same length as in S, where $T_n$ is obtained by a transformation of S. Let assume that there are L such transformations, each producing different QO sets $T_n$, n=1, ..., L, such that the absolute value of the inner product between any sequence from S and any sequence from $T_n$ has a small value compared to the energy the sequences.

Then according to a first aspect of the present invention, a QO superset Z is created as the union of s and all $T_n$, n=1, ..., L. In this way the number of orthogonal sets is extended while keeping the interference between the orthogonal sets low. The design of the QO superset through the inclusion of the first QO set s is an important feature that allows compatibility between an existing communication system and its future extensions, i.e. backwards compatibility which is an important e.g. when designing new communication systems.

Mathematically, the QO superset Z can be described as:

$$Z = S \bigcup_{n=1}^{L} T_n$$

The transformation used to generate the second set $T_n$, can for example be the multiplication symbol-by-symbol of each sequence from S by a specially constructed signature sequence of the same length.

FIG. 1 graphically illustrates an embodiment of the present invention. A first set S comprising a plurality of quasi-orthogonal sets of sequences is generated. Based on the first set S second sets of quasi-orthogonal sets of sequences $T_h$ is generated by a transformation by symbol-by-symbol multiplication of each sequence in the first set S with signature sequences $\{w_h(k)\}$, so as to obtain a superset z which is an extension of the first set S. In the following, non-limiting exemplary embodiments of the present invention are described.

First Exemplary Embodiment of the Invention: Higher-Order Polynomial Phase Signatures The QO sets in equations (2) and (3) can be derived from the same construction of quadratic polynomial phase QO sequences. Namely, for N odd, α=(N+1)/2 is an integer, so we can re-write equation (2) as:

$$s_{m,l}(k) = e^{-j\frac{2\pi}{N}[\alpha m k^2 + m(l+2q+1)k + \alpha m l(l+2q+1)]} \quad 1.$$

$$m = 1, \ldots, N-1, \quad l, k = 0, 1, \ldots, N-1.$$

As N is a prime, the sequence of coefficients αm (mod N) attached to the quadratic term $k^2$ is a permutation of the sequence m=1, ..., N−1, which determines the ordinal numbers of orthogonal subsets in the QO set. Similarly, for given m, the sequence of coefficients m(l+2q+1)(mod N) attached to the linear term k is a permutation of the sequence l=0, 1, ..., N−1, which determines the ordinal numbers of sequences in the αm(mod N)-th orthogonal subset. The sequence of coefficients αml(l+2q+1)(mod N) determines the unit-magnitude complex constants which multiply various QO sequences, so it does not influence the absolute value of the inner product of any two sequences.

Similarly, the construction of equation (3) can be re-written as:

$$s_{m,l}(k) = e^{j\frac{2\pi}{N}k^3} e^{-j\frac{2\pi}{N}m^3} e^{-j\frac{2\pi}{N}[3mk^2-(3m^2+l)k]},$$
$$m, l, k = 0, 1, \ldots, N-1.$$

The left-most exponential term in the above formula, the cubic polynomial phase sequence, is common for all the QO sequences, so it could be omitted without changing correlation properties of the QO sequences. The middle exponential term is a unit-magnitude complex constant which multiply a QO sequence, so it does not influence the absolute value of the inner product of any two sequences. The sequence of coefficients 3m (mod N) attached to the quadratic term $k^2$ is a permutation of the sequence m=1, ..., N−1. Similarly, for given m the sequence of coefficients −(3m²+l)(mod N) attached to the linear term k is a permutation of the sequence l=0, 1, ..., N−1.

As the order of subsets and sequences do not influence the correlation properties between the sequences, from the last two expressions we can define another construction of QO sequences with the same inner product properties, based on quadratic polynomial phase, as:

$$s_{m,l}^{(2)}(k) = e^{-j\frac{2\pi}{N}p_m^{(2)}(k)} e^{-j\frac{2\pi}{N}lk} \quad (4)$$
$$P_m^{(2)}(k) = mk^2, \quad m, l, k = 0, 1, \ldots, N-1, N \text{ is a prime.}$$

It should be noted that equation (4) contains an additional orthogonal subset compared to equation (2), obtained for m=0, while still having the maximum absolute value of the inner product of any two sequences (2) belonging to the different orthogonal sets not larger than √N. Note that for m≠0, the constructions of equations (2) and (4) are equivalent up to unit-magnitude complex constants.

The inner product properties of the construction (4) can be directly proven from the Carlitz-Uchiyama bound, given as:

$$\left|\sum_{k=0}^{N-1} e^{j2\pi f(k)/N}\right| \le (r-1)\sqrt{N},$$

where f(x) is a polynomial of order r whose coefficients are positive integers, and N is prime. The construction of equation (4) and the Carlitz-Uchiyama bound suggest that more orthogonal sets in a QO set of sequences can be obtained by a generalization towards higher-order polynomial phase sequences.

If we denote the QO set of sequences defined by equation (4) as S, then a sequence $\{s_{n,m,l}^{(Q)}(k)\}$ from a new set $T_n$, n=0, 1, ..., $N^{Q-2}$−1, obtained by a transformation of the sequence $\{s_{m,l}^{(2)}(k)\}$ from the QO set S can be defined as:

$$s_{n,m,l}^{(Q)}(k) = w_n(k)s_{m,l}^{(2)}(k), \quad (5)$$

where $$l, k = 0, 1, \ldots, N-1,$$

$$w_n(k) = e^{-j\frac{2\pi}{N}P_n^Q(k)},$$

$$P_n^{(Q)}(k) = \sum_{q=0}^{Q-3} n_q k^{q+3},$$

and $$n = \sum_{q=0}^{Q-3} n_q N^q = 0, 1, \ldots, N^{Q-2}-1.$$

The total number of orthogonal sets increases exponentially with Q as $N^{Q-1}$, while the maximum interference increases linearly as (Q−1)√N.

When Q>2, the construction of equation (5) can be also viewed as if the QO set of cyclically shifted Zadoff-Chu sequences with different root indices is extended by additional orthogonal sets obtained by multiplying symbol-by-symbol the original Zadoff-Chu sequence by higher-order polynomial phase sequences.

Second Exemplary Embodiment of the Invention: CAZAC Signature Sequences

The QO set of equation (5) can be used to create a QO superset Z of double size at the price of relatively small increase of the maximum absolute value of the inner product between the sequences. The superset Z of $2N^Q$ sequences is a union of the original set (5) and its covered version, obtained by multiplying all the sequences in equation (5) with a common CAZAC sequence {w(k)}.

Mathematically, this construction can be described as:

$$Z = S \cup T$$

$$S = [\{s_{n,m,l}^{(Q)}(k)\}_{m=0}^{N-1}]_{l=0}^{N-1}]_{n=0}^{N^{Q-2}-1}, T = [\{w(k)s_{n,m,l}^{(Q)}(k)\}_{m=0}^{N-1}]_{l=0}^{N-1}]_{n=0}^{N^{Q-2}-1} \quad (6)$$

l,k=0, 1, ..., N−1, N is a prime, where $\{s_{n,m,u}^{(Q)}(k)\}$ is defined by equations (4) and (5). The product sequence $\{w(k)s_{n,m,l}^{(Q)}(k)\}$ from the set T, which we shall denote as $\{t_{n,m,l}^{(Q)}(k)\}$, must not be equivalent to any sequence from the set S. This condition is obviously satisfied if the alphabet of a CAZAC sequence is different from the alphabet of the polynomial-phase sequences. For example, any bi-phase CAZAC sequence will satisfy this condition for any N>2.

The absolute value of the inner product between any two sequences $$s_{n,m,u}^{(Q)} = \{s_{n,m,u}^{(Q)}(k)\} \text{ and } t_{n,m,v}^{(Q)} = \{t_{n,m,v}^{(Q)}(k)\} \text{ is } \sqrt{N}, \text{ i.e.}:$$

$$|\langle s_{n,m,u}^{(Q)}, t_{n,m,v}^{(Q)}\rangle| = \left|\sum_{k=0}^{N-1} w(k)e^{-j\frac{2\pi}{N}(v-u)k}\right| = \sqrt{N},$$

what follows from the definition of CAZAC sequences, whose all Discrete Fourier Transform (DFT) coefficients have the amplitude equal to √N. The above equation shows that the maximum interference between any two sequences such that one sequence belongs to one orthogonal subset within the first set S and the other sequence belongs to the corresponding orthogonal subset within the transformed second set T is the minimum possible for a given sequence length N.

As mentioned before, the ZC sequences (1) represent a family of polyphase CAZAC sequences. A family of bi-phase CAZAC sequences is the family of Björck sequences. A Björck sequence $\{x(k)\}$ can be defined only for prime lengths N.

For prime lengths $N \equiv 1 \pmod 4$, the Björck sequences are defined as:

$$x(k) = e^{j\theta\left(\frac{k}{N}\right)}, \quad (7)$$
$$\theta = \cos^{-1}\left(\frac{1}{1+\sqrt{N}}\right),$$
$$k = 0, 1, \ldots, N-1,$$

where $$\left(\frac{k}{N}\right)$$

is the Legendre symbol, defined for any integer k and any prime N, as:

$$\left(\frac{k}{N}\right) = \begin{cases} 0, & \text{if } k \equiv 0 (\mathrm{mod} N) \\ +1, & \text{if } k \not\equiv 0 (\mathrm{mod} N) \text{ is a square } (\mathrm{mod} N) \\ -1, & \text{if } k \not\equiv 0 (\mathrm{mod} N) \text{ is not a square } (\mathrm{mod} N). \end{cases} \quad (8)$$

For prime lengths $N \equiv 3 \pmod 4$ the Björck sequences are defined as:

$$x(k) = \begin{cases} 1 \text{ or } e^{j\phi}, & k = 0 \\ e^{j\frac{\phi}{2}\left[1-\left(\frac{k}{N}\right)\right]}, & k = 1, 2, \ldots, N-1 \end{cases} \quad (9)$$
$$\phi = \cos^{-1}\left(\frac{1-N}{1+N}\right).$$

If $\{w(k)\}$ is a Björck sequence, the absolute value of the inner product between any two sequences $\{s_{a,b,u}^{(Q)}(k)\}$ and $\{t_{c,d,v}^{(Q)}(k)\}$, where $a \neq c$, $b \neq d$, is less than or equal to $$Q\sqrt{N}\frac{1+\sqrt{2\sqrt{N}+N}}{1+\sqrt{N}}$$

when $$N \equiv 1 (\mathrm{mod} 4),$$

and less than or equal to $$Q\sqrt{N}\frac{1+\sqrt{N}}{\sqrt{1+N}}$$

when $$N \equiv 3 (\mathrm{mod} 4).$$

To prove the above statement for $N \equiv 1 (\mathrm{mod}\ 4)$, we start from the definition of the inner product:

$$\left\langle s_{a,b,u}^{(Q)}, t_{c,d,v}^{(Q)} \right\rangle = \sum_{k=0}^{N-1} e^{j\theta\left(\frac{k}{N}\right)} e^{-j\frac{2\pi}{N}\left[\sum_{q=0}^{Q-3}(c_q-a_q)k^{q+3}+(d-b)k^2+(v-u)k\right]} =$$

$$1 + \sum_{k=1}^{N-1} \left[\cos\theta + j\left(\frac{k}{N}\right)\sin\theta\right] e^{-j\frac{2\pi}{N}\left[\sum_{q=0}^{Q-3}(c_q-a_q)k^{q+3}+(d-b)k^2+(v-u)k\right]} =$$

$$1 - \cos\theta + A\cos\theta + jB\sin\theta,$$

where $$A = \sum_{k=0}^{N-1} e^{-j\frac{2\pi}{N}\left[\sum_{q=0}^{Q-3}(c_q-a_q)k^{q+3}+(d-b)k^2+(v-u)k\right]}$$

$$B = \sum_{k=1}^{N-1} \left(\frac{k}{N}\right) e^{-j\frac{2\pi}{N}\left[\sum_{q=0}^{Q-3}(c_q-a_q)k^{q+3}+(d-b)k^2+(v-u)k\right]}.$$

The summation A is limited by the Carlitz-Uchiyama bound, while the summation B is limited by Weil's bound, given as:

$$\left|\sum_{k=1}^{N-1}\left(\frac{k}{N}\right)e^{j2\pi f(k)/N}\right| \leq r\sqrt{N},$$

where f(x) is a polynomial of order r whose coefficients are positive integers, and N is a prime. The absolute value of the above inner product is less than or equal to the sum of absolute values of each of its components, so we have $$\left|\left\langle s_{a,b,u}^{(Q)}, t_{c,d,v}^{(Q)}\right\rangle\right| \leq 1 - \cos\theta + (Q-1)\sqrt{N}\cos\theta + Q\sqrt{N}\sin\theta.$$

where $\cos\theta$ and $\sin\theta$ are always positive, according to the definition of $\theta$. From the definition of $\theta$ it further follows that:

$$\left|\left\langle s_{a,b,u}^{(Q)}, t_{c,d,v}^{(Q)}\right\rangle\right| \leq Q\sqrt{N}\frac{1+\sqrt{2\sqrt{N}+N}}{1+\sqrt{N}}.$$

The above expression holds if $N>5$, because if $N=5$ the alphabet of the Björck sequence is the same as the alphabet of the polynomial phase sequences, as it holds:

$$\cos^{-1}\left(\frac{1}{1+\sqrt{5}}\right) = \frac{2\pi}{5}.$$

For N≡3 (mod 4), it follows:

$$\langle s_{a,b,u}^{(Q)}, t_{c,d,c}^{(Q)}\rangle = 1 + \sum_{k=1}^{N-1} e^{j\frac{\phi}{2}[1-(\frac{k}{N})]}e^{-j\frac{2\pi}{N}[\sum_{q=0}^{Q-3}(c_q-a_q)k^{q+3}+(d-b)k^2+(v-u)k]} =$$

$$1 + e^{j\frac{\phi}{2}}\sum_{k=1}^{N-1}\left[\cos\frac{\phi}{2} - j\left(\frac{k}{N}\right)\sin\frac{\phi}{2}\right]e^{-j\frac{2\pi}{N}[\sum_{q=0}^{Q-3}(c_q-a_q)k^{q+3}+(d-b)k^2+(v-u)k]} =$$

$$1 - e^{j\frac{\phi}{2}}\cos\frac{\phi}{2} + Ae^{j\frac{\phi}{2}}\cos\frac{\phi}{2} - jBe^{j\frac{\phi}{2}}\sin\frac{\phi}{2}.$$

Then we have:

$$|\langle s_{a,b,u}^{(Q)}, t_{c,d,v}^{(Q)}\rangle| \le \left|1 - e^{j\frac{\phi}{2}}\cos\frac{\phi}{2}\right| + (Q-1)\sqrt{N}\cos\frac{\phi}{2} + Q\sqrt{N}\sin\frac{\phi}{2},$$

where $$\cos\frac{\phi}{2} \text{ and } \sin\frac{\phi}{2}$$

are always positive, according to the definition of $\phi$. From the definition of $\phi$ it further follows that:

$$|\langle s_{a,b,u}^{(Q)}, t_{c,d,v}^{(Q)}\rangle| \le Q\sqrt{N}\frac{1+\sqrt{N}}{\sqrt{1+N}}.$$

Thus we see that while the total number of orthogonal sets increases exponentially with Q as $2N^{Q-1}$, the maximum interference increases as very close to $Q\sqrt{N}$.

In the special case when Q=2, i.e. when the quadratic-phase polynomial sequences are used, the above construction can be applied to extend the number of orthogonal sets of the LTE RACH preambles and SRSs of length N, where a Björck sequence can be used as a cover code for the different orthogonal sets of cyclic Zadoff-Chu sequences.

Third Exemplary Embodiment of the Invention: Signature Sequences Based on m-Sequences The maximum length shift-register sequences, also known as m-sequences, are the only known sequences that possess the so-called "shift-and-add" property. The shift-and-add property implies that the symbol-by-symbol product of a sequence and its different cyclically shifted version is equal to another cyclically shifted version of the same sequence. The m-sequences are a special case of the general class of GMW sequences, see "GMW Sequences" by R. A. Scholtz and L. R. Welch in IEEE Trans. On Inform. Theory, Vol. 30, No. 3, pp. 548-553, May 1984. It can be shown that the only GMW sequences that possess the shift-and-add property are the m-sequences.

The m-sequences can be defined by using the trace functions over extended Galois fields, as:

$$w(k) = e^{-j\frac{2\pi}{p}Tr(\beta\alpha^k)}, k = 0, 1, \ldots, p^m - 1,$$ (10)

where Tr(x) is the trace function from the Galois Field GF(q) to GF(p), given by:

$$Tr(x) = \sum_{i=0}^{m-1} x^{p^i},$$

while $q=p^m$, p is a prime, $\alpha$ is the primitive element of GF(q), and $\beta$ is an arbitrary non-zero element of GF(q). The shift-and-add property comes from the property of the trace function that:

$$Tr(x+y)=Tr(x)+Tr(y).$$ (11)

The QO superset set z of $N^{Q+1}$ sequences we shall define as a union of the set (5) and its N covered versions, obtained by multiplying the orthogonal sets of sequences defined by (5) with the different cyclically shifted versions of an m-sequence {w(k)} of length N, where $N=p^m-1$ is a positive integer such that m>1 and p is a prime. Mathematically, this construction can be described as:

$$Z = S \bigcup_{h=0}^{N-1} T_h$$ (12)

$$S = \left[\{s_{n,m,l}^{(Q)}(k)\}_{m=0}^{N-1}\right]_{n=0}^{N^{Q-2}-1},$$

$$T_h = \left[\{w(k+h)s_{n,m,l}^{(Q)}(k)\}_{m=0}^{N-1}\right]_{n=0}^{N^{Q-2}-1}$$

$l, k = 0, 1, \ldots, N-1, N = p^m - 1, m > 1, p$ is a prime.

Using the shift-and-add property of m-sequences and the fact that the magnitude of the Fourier transform of m-sequences is $\sqrt{N+1}$ for all non-zero frequencies, and 1 for the zero frequency, it can be easily proved that the absolute value of the inner product between any two sequences $\{t_{h0,n,m,u}^{(Q)}(k)\}$ and $\{t_{h1,n,m,v}^{(Q)}(k)\}$, $h0 \ne h1$, as well as between any two sequences $\{s_{n,m,u}^{(Q)}(k)\}$ and $\{t_{h,n,m,v}^{(Q)}(k)\}$, is either $\sqrt{N+1}$, when $u \ne v$, or 1, when $u=v$.

This property becomes obvious from the following consideration.

$$|\langle t_{h0,n,m,u}^{(Q)}, t_{h1,n,m,v}^{(Q)}\rangle| = \left|\sum_{k=0}^{N-1} w(k+h0)w(k+h1)e^{-j\frac{2\pi}{N}(v-u)k}\right| =$$ (13)

$$\left|\sum_{k=0}^{N-1} w(k+h2)e^{-j\frac{2\pi}{N}(v-u)k}\right| = \begin{cases} \sqrt{N+1}, & \text{if } u \ne v \\ 1, & \text{if } u = v. \end{cases}$$

The above equation shows that the maximum interference between any two sequences such that one sequence belongs to one orthogonal subset within the first set S and the other sequence belongs to the corresponding orthogonal subset within the transformed second set T is close to the minimum possible for a given sequence length N. Additionally, the maximum interference between two sequences belonging to two different orthogonal subsets obtained from the same orthogonal subset through the corresponding two different transformations is close to the minimum possible, i.e. $\sqrt{N}$.

If the length of the m-sequence $N=p^m-1$, m>1, is restricted to be a prime, in order to insure the minimum interference between the orthogonal sets defined by (5), then only binary m-sequences can be used. Namely, it can be shown that if p and m are natural numbers such that $N=p^m-1$ is a prime, then p=2 or m=1.

The inner product I between any two sequences $\{s_{a,b,u}^{(Q)}(k)\}$ and $\{t_{h,c,v}^{(Q)}(k)\}$, or $\{t_{h0,a,b,u}^{(Q)}(k)\}$ and $\{t_{h1,a,d,v}^{(Q)}(k)\}$, where $a\neq c$, $b\neq d$, can be modelled as:

$$I = \sum_{k=0}^{N-1} e^{-\frac{2\pi}{p}Tr(\alpha^{k+h})} e^{-j\frac{2\pi}{N}f(x)} \quad (14)$$

where f(x) is a polynomial of order r, $2\leq r\leq Q$, whose coefficients are positive integers, and h is a cyclic shift of the m-sequence.

It has been found by the numerical evaluations of (14) that a rather tight upper bound of I for $N\leq 127$ can be established as:

$$I < Q\sqrt{N+1} + \frac{\log_2(N+1)}{Q-1}, Q > 1. \quad (15)$$

Thus, while the total number of orthogonal sets increases exponentially with Q as $N^Q$, the maximum interference increases as close to $Q\sqrt{N+1}$.

In the special case when Q=2, i.e. when the quadratic-phase polynomial sequences are used, the above construction can be applied to extend the number of orthogonal sets of the LTE RACH preambles and SRSs of length N, where cyclic versions of an m-sequence can be used as different cover codes for the orthogonal sets of cyclic Zadoff-Chu sequences. In case that $N=p^m-1$, $m>1$, is not a prime, the absolute value of the cross-correlation between the Zadoff-Chu sequences having different root indices (and thus belonging to different orthogonal sets in QO sets S or $T_h$) might be slightly larger than $\sqrt{N}$, equal to $\sqrt{g_N^{a,b}N}$, where $g_N^{a,b}=\gcd(N, a-b)$ is the greatest common divisor of N and (a-b).

Furthermore, as understood by the person skilled in the art, a method according to the present invention for generating a superset Z of quasi-orthogonal sets of sequences may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The invention relates further to a device corresponding to the methods described above. It should also be noted that device may be modified, mutatis mutandis, according to the different embodiments of the method in a receive node and transmit node described above.

It should also be noted that present invention relates to the use of QO sequences generated above in wireless communication systems, and especially in cellular wireless communication systems, such as LTE and LTE advanced. The access techniques employed may be OFDM, FDMA, CDMA or any other suitable technique.

Preferably, the QO sequences belonging to the superset Z are used as RACH preamble and/or SRS in such communication systems.

Finally, it should be understood that the present invention is not limited to the embodiments described above, but also relates to and incorporates all embodiments within the scope of the appended independent claims.

The invention claimed is:

1. A user equipment, comprising:
a memory retaining instructions, and
a processor, coupled to the memory, configured to execute the instructions retained in the memory, wherein the instructions are related to:
selecting a random access channel (RACH) preamble sequence from a superset Z of quasi-orthogonal sets of sequences; and
transmitting the RACH preamble sequence to a base station, the superset Z of quasi-orthogonal sets of sequences being a union of a first set S and L number of second sets $T_h$, so that $$Z = S \bigcup_{h=0}^{L-1} T_h;$$

wherein the first set S comprising a plurality of quasi-orthogonal sets of sequences; and
wherein the L number of second sets of quasi-orthogonal sets of sequences $T_h$ is a symbol-by-symbol multiplication of each sequence in said first set S with signature sequences $\{w_h(k)\}$, wherein h=0, . . . , L-1, L is a positive integer larger than or equal to one, and each second set $T_h$ has the same number of quasi-orthogonal sets of sequences and the same length of sequences as said first set S.

2. A base station, comprising:
a memory retaining instructions, and
a processor, coupled to the memory, configured to execute the instructions retained in the memory, wherein the instructions are related to:
receiving a random access channel (RACH) preamble sequence, the RACH preamble sequence being selected from a superset Z of quasi-orthogonal sets of sequences, the superset Z of quasi-orthogonal sets of sequences being a union of a first set S and L number of second sets so that $$Z = S \bigcup_{h=0}^{L-1} T_h;$$

and
estimating a time of arrival of the RACH preamble sequence;
wherein the first set S comprising a plurality of quasi-orthogonal sets of sequences; and
wherein the L number of second sets of quasi-orthogonal sets of sequences $T_h$ is a symbol-by-symbol multiplication of each sequence in said first set S with signature sequences $\{w^h(k)\}$, wherein h=0, . . . , L-1, L is a positive integer larger than or equal to one, and each second set $T_h$ has the same number of quasi-orthogonal sets of sequences and the same length of sequences as said first set S.

3. The user equipment according to claim 1, wherein said first set S is a quasi-orthogonal set of quadratic polynomial phase sequences $\{s_{m,l}^{(2)}(k)\}$ such that:

$$s_{m,l}^{(2)}(k) = e^{-j\frac{2\pi}{N}P_m^{(2)}(k)} e^{-j\frac{2\pi}{N}lk},$$

where
- $P_m^{(2)}(k) = mk^2$, $m,l,k=0, 1, \ldots, N-1$, and N is a positive integer; and
- quasi-orthogonal sequences $\{s_{n,m,l}^{(Q)}(k)\}$ in each second set $T_n$, $n=0, 1, \ldots, N^{Q-2}-1$, are given by:

$$s_{n,m,l}^{(Q)}(k) = w_n(k)s_{m,l}^{(2)}(k), \text{ where, } l, k = 0, 1, \ldots, N-1,$$

$$w_n(k) = e^{-j\frac{2\pi}{N}P_n^{Q}(k)}, P_n^{(Q)}(k) = \sum_{q=0}^{Q-3} n_q k^{q+3}, \text{ and}$$

$$n = \sum_{q=0}^{Q-3} n_q N^q = 0, 1, \ldots, N^{Q-2} - 1.$$

4. The user equipment according to claim 3, wherein L=1 and said first set S is a quasi-orthogonal set of Q-order polynomial phase sequences $\{s_{n,m,l}^{(Q)}(k)\}$; and quasi-orthogonal sequences $\{t_{n,m,l}^{(Q)}(k)\}$ in said second set T are given by:
T=$[\{w(k)\ s_{n,m,l}^{(Q)}(k)\}_{m=0}^{N-1}]_{n=0}^{N^{Q-2}-1}$, where l,k =0, 1, ..., N−1, and
$\{w(k)\}$ is a single constant amplitude zero autocorrelation (CAZAC) sequence.

5. The user equipment according to claim 3, wherein said first set S is a quasi-orthogonal set of Q-order polynomial phase sequences $\{s_{n,m,l}^{(Q)}(k)\}$; and quasi-orthogonal sequences $\{t_{h,n,m,l}^{(Q)}(k)\}$ in each second set $T_h$ is given by:
$T_h=[\{w(k+h)\ s_{n,m,l}^{(Q)}(k)\}_{m=0}^{N-1}]_{n=0}^{N^{Q-2}-1}$, wherein h=0, 1, ..., N−1
l,k=0, 1, ..., N−1, N=$p^m$−1, m>1, p is a prime, and $\{w(k)\}$ is a m-sequence.

6. The user equipment according to claim 4, wherein said constant amplitude zero autocorrelation (CAZAC) sequence is a Björck sequence.

7. The base station according to claim 2, wherein said first set S is a quasi-orthogonal set of quadratic polynomial phase sequences $\{s_{m,l}^{(2)}(k)\}$ such that:

$$s_{m,l}^{(2)}(k) = e^{-j\frac{2\pi}{N}P_m^{(2)}(k)}e^{-j\frac{2\pi}{N}lk},$$

where
- $P_m^{(2)}(k)=mk^2$, $m,l,k=0, 1, \ldots, N-1$, and N is a positive integer; and
- quasi-orthogonal sequences $\{s_{n,m,l}^{(Q)}(k)\}$ in each second set $T_n$, $n=0, 1, \ldots, N^{Q-2}-1$, are given by:

$$s_{n,m,l}^{(Q)}(k) = w_n(k)s_{m,l}^{(2)}(k), \text{ where, } l, k = 0, 1, \ldots, N-1,$$

$$w_n(k) = e^{-j\frac{2\pi}{N}P_n^{Q}(k)}, P_n^{(Q)}(k) = \sum_{q=0}^{Q-3} n_q k^{q+3}, \text{ and}$$

$$n = \sum_{q=0}^{Q-3} n_q N^q = 0, 1, \ldots, N^{Q-2} - 1.$$

8. The base station according to claim 7, wherein L=1 and said first set S is a quasi-orthogonal set of Q-order polynomial phase sequences $\{s_{n,m,l}^{(Q)}(k)\}$; and quasi-orthogonal sequences $\{t_{n,m,l}^{(Q)}(k)\}$ in said second set T are given by:
T=$[\{w(k)\ s_{n,m,l}^{(Q)}(k)\}_{m=0}^{N-1}]_{n=0}^{N^{Q-2}-1}$, where l,k=0, 1, ..., N−1, and $\{w(k)\}$ is a single constant amplitude zero autocorrelation (CAZAC) sequence.

9. The base station according to claim 7, wherein said first set S is a quasi-orthogonal set of Q-order polynomial phase sequences $\{s_{n,m,l}^{(Q)}(k)\}$; and quasi-orthogonal sequences $\{t_{h,n,m,l}^{(Q)}(k)\}$ in each second set $T_h$ is given by:
$T_h=[\{w(k=h)\ s_{n,m,l}^{(Q)}(k)\}_{m=0}^{N-1}]_{n=}^{N^{Q-2}-1}$, where h =0, 1, ..., N−1
l,k=0, 1, ..., N−1, N=$p^m$−1, m>1, p is a prime, and $\{w(k)\}$ is a m-sequence.

10. The base station according to claim 8, wherein said constant amplitude zero autocorrelation (CAZAC) sequence is a Björck sequence.

11. A method comprising:
selecting, using a processor of a user equipment, a random access channel (RACH) preamble sequence from a superset Z of quasi-orthogonal sets of sequences; and
transmitting the RACH preamble sequence to a base station, the superset Z of quasi-orthogonal sets of sequences being a union of a first set S and L number of second sets $T_h$, so that $$Z = S \bigcup_{h=0}^{L-1} T_h;$$

wherein the first set S comprising a plurality of quasi-orthogonal sets of sequences; and
wherein the L number of second sets of quasi-orthogonal sets of sequences $T_h$ is a symbol-by-symbol multiplication of each sequence in said first set S with signature sequences $\{w_h(k)\}$, wherein h=0, ..., L−1, L is a positive integer larger than or equal to one, and each second set $T_h$ has the same number of quasi-orthogonal sets of sequences and the same length of sequences as said first set S.

12. The method according to claim 11, wherein said first set S is a quasi-orthogonal set of quadratic polynomial phase sequences $\{s_{m,l}^{(2)}(k)\}$ such that:

$$s_{m,l}^{(2)}(k) = e^{-j\frac{2\pi}{N}P_m^{(2)}(k)}e^{-j\frac{2\pi}{N}lk},$$

where
- $P_m^{(2)}(k)=mk^2$, $m,l,k=0, 1, \ldots, N-1$, and N is a positive integer; and
- quasi-orthogonal sequences $\{s_{n,m,l}^{(Q)}(k)\}$ in each second set $T_n$, $n=0, 1, \ldots, N^{Q-2}-1$, are given by:

$$s_{n,m,l}^{(Q)}(k) = w_n(k)s_{m,l}^{(2)}(k), \text{ where, } l, k = 0, 1, \ldots, N-1,$$

$$w_n(k) = e^{-j\frac{2\pi}{N}P_n^{Q}(k)}, P_n^{(Q)}(k) = \sum_{q=0}^{Q-3} n_q k^{q+3}, \text{ and}$$

$$n = \sum_{q=0}^{Q-3} n_q N^q = 0, 1, \ldots, N^{Q-2} - 1.$$

13. The method according to claim 12, wherein L=1 and said first set S is a quasi-orthogonal set of Q-order polynomial phase sequences $\{s,m,l^{(Q)}(k)\}$; and quasi-orthogonal sequences $\{t_{n,m,l}^{(Q)}(k)\}$ in said second set T are given by:
T=$[\{w(k)s_{n,m,l}^{(Q)}(k)\}_{m=0}^{N-1}]_{n=0}^{N^{Q-2}-1}$, where l,k =0, 1, ..., N−1, and $\{w(k)\}$ is a single constant amplitude zero autocorrelation (CAZAC) sequence.

14. The method according to claim 12, wherein said first set S is a quasi-orthogonal set of Q-order polynomial phase sequences $\{s_{n,m,l}^{(Q)}(k)\}$; and quasi-orthogonal n,m, sequences $\{t_{h,n,m,l}^{(Q)}(k)\}$ in each second set $T_h$ is given by:
$T_h = [\{w(k+h)s_{n,m,l}^{(Q)}(k)\}_{m=0}^{N-1}]_{n=0}^{N^{Q-2}-1}$, where h=0, 1,..., N-1
l, k=0, 1,..., N-1, N=$p^m$-1, m>1, p is a prime, and $\{w(k)\}$ is a m-sequence.

15. The method according to claim 13, wherein said constant amplitude zero autocorrelation (CAZAC) sequence is a Björck sequence.

16. A method comprising:
receiving, by a processor of a base station, a random access channel (RACH) preamble sequence, the RACH preamble sequence being selected from a superset Z of quasi-orthogonal sets of sequences the superset Z of quasi-orthogonal sets of sequences being a union of a first set S and L number of second sets so that $$Z = S \bigcup_{h=0}^{L-1} T_h;$$

and
estimating a time of arrival of the RACH preamble sequence;
wherein the first set S comprising a plurality of quasi-orthogonal sets of sequences; and
wherein the L number of second sets of quasi-orthogonal sets of sequences $T_h$ is a symbol-by-symbol multiplication of each sequence in said first set S with signature sequences $\{w_h(k)\}$, wherein h=0, ..., L-1, L is a positive integer larger than or equal to one, and each second set $T_h$ has the same number of quasi-orthogonal sets of sequences and the same length of sequences as said first set S.

17. The method according to claim 16, wherein said first set S is a quasi-orthogonal set of quadratic polynomial phase sequences $\{s_{m,l}^{(2)}(k)\}$ such that:

$$s_{m,l}^{(2)}(k) = e^{-j\frac{2\pi}{N}P_m^{(2)}(k)} e^{-j\frac{2\pi}{N}lk},$$

where
$P_m^{(2)}(k) = mk^2$, m, l, k=0, 1, ..., N-1, and N is a positive integer; and
quasi-orthogonal sequences $\{s_{n,m,l}^{(Q)}(k)\}$ in each second set $T_n$, n=0, 1, ..., $N^{Q-2}$-1, are given by:

$$s_{n,m,l}^{(Q)}(k) = w_n(k)s_{m,l}^{(2)}(k), \text{ where, } l, k = 0, 1, \ldots, N-1,$$

$$w_n(k) = e^{-j\frac{2\pi}{N}P_n^Q(k)}, P_n^{(Q)}(k) = \sum_{q=0}^{Q-3} n_q k^{q+3}, \text{ and}$$

$$n = \sum_{q=0}^{Q-3} n_q N^q = 0, 1, \ldots, N^{Q-2} - 1.$$

18. The method according to claim 17, wherein L=1 and said first set S is a quasi-orthogonal set of Q-order polynomial phase sequences $\{s_{n,m,l}^{(Q)}(k)\}$; and quasi-orthogonal sequences $\{t_{n,m,l}^{(Q)}(k)\}$ in said second set T are given by:
$T=[\{w(k) s_{n,m,l}^{(Q)}(k)\}_{m=0}^{N-1}]_{n=0}^{N^{Q-2}-1}$, where l, k=0, 1, ..., N-1, N-1, and $\{w(k)\}$ is a single constant amplitude zero autocorrelation (CAZAC) sequence.

19. The method according to claim 17, wherein said first set S is a quasi-orthogonal set of Q-order polynomial phase sequences $\{s_{n,m,l}^{(Q)}(k)\}$; and quasi-orthogonal sequences $\{t_{h,n,m,l}^{(Q)}(k)\}$ in each second set $T_h$ is given by:
$T_h = [\{w(k+h)s_{n,m,l}^{(Q)}(k)\}_{m=0}^{N-1}]_{n=0}^{N^{Q-2}-1}$, where h=0, 1, ..., N-1
l,k=0, 1, ..., N-1, N=$p^m$-1, m>1, p is a prime, and $\{w(k)\}$ is a m-sequence.

20. The method according to claim 13, wherein said constant amplitude zero autocorrelation (CAZAC) sequence is a Björck sequence.

* * * * *